Patented Sept. 27, 1938

2,131,064

UNITED STATES PATENT OFFICE 2,131,064

FOOD BASE AND COMPOSITION CONTAINING SAME

Albert Musher, New York, N. Y., assignor to Musher Corporation, Elizabeth, N. J., a corporation of New Jersey No Drawing. Application May 29, 1937, Serial No. 145,627

11 Claims. (Cl. 99—144)

The present invention relates to compositions useful for food purposes, and more particularly to base materials that can be utilized in admixture with added components to give various types of food products, as well as to methods of preparing such base materials, and compositions utilizing them.

Various types of materials in the nature of spreads and similar type compositions are known in the art. They are, however, open to a number of disadvantages, both with respect to manufacture, and use. Some spreads, for example, are relatively thin in character, while others are relatively hard. Both while having some desirable characteristics offer difficulties of various types. Other types of spreads such as jellies, peanut butter, etc., while they can be placed on bread, for example, do not possess desirable spreading characteristics, and where high moisture content is present, tend to produce sogginess in the bread, etc.

Such prior art types of materials, as well as others in the nature of sauces, drinks, icings, etc. require the production of individual mixtures to be used for specific purposes, so that only one particular type of product can be made up at a time from given materials. Furthermore, many of these materials do not lend themselves to economical methods of packaging, storage and sales, since they are of a nature where they must be packaged in glass containers, etc.

Among the objects of the present invention is the production of base materials that can be converted into various types of products, such as spreads, icings, etc. by incorporation of desired added components into the base material, such incorporation being readily accomplished.

Still further objects include the production of food compositions utilizing such base materials.

Still further objects include methods of producing such base materials and of the food compositions including them.

Other and further objects and advantages will also appear from the more detailed description given below, it being understood, however, that this more detailed description is given by way of illustration and explanation only, and not by way of limitation, since various changes therein may be made by those skilled in the art without departing from the scope and spirit of the present invention.

In accordance with the present invention, base materials are produced which can be utilized for production of various types of food compositions in the nature of spreads, fillings, sauces, drinks, icings, etc. by simple incorporation of added food components, condiments, flavoring materials, etc. to such base material, such incorporation of added components being readily accomplished in ordinary manufacturing processes with simple equipment where the final products are manufactured for consumer use, or by the housewife where the base materials, or compositions containing the same, are modified by incorporation of added ingredients.

The base materials utilized in accordance with the present invention are desirably produced from a relatively hard fat material and a water-absorbent bodier component. The relatively hard fat component, which is desirably employed in accordance with the present invention, may vary considerably in character. It may consist of individual fats or hardened oils, or of mixtures of hard fats and oils in proportions to give the desired consistency. Various oils and fats may be utilized in producing such components, including, for example, olive oil, cottonseed oil, corn oil, peanut oil, cocoanut oil, oleo oil, oleo stock, oleostearin, lard, and other edible vegetable and animal oils and fats, either in their natural states, hydrogenated, or partially hydrogenated. The proportions of such components utilized are chosen to give a relatively hard fat, that is a fatty component of more or less solid consistency, and desirably such fatty component will have a melting point for usual purposes of from 70 to 120° F., but for preferred purposes will have a narrower range of melting point, as, for example, from 95 to 98° F. The particular consistency or melting point of the composition will depend on various considerations, including the manner of use of the product, the nature of the added components included with such fat, the proportions of moisture in the final composition, so that consistency may be varied within substantial limits, while still giving a relatively hard fat component, such variation in properties being desirable in order to enable the materials to be employed for a variety of purposes, in desired climates, etc.

The water-absorbent bodier component may be chosen from a wide variety of materials, particularly the thickeners, etc., commonly used in the production of food products, including such materials as the starches, specifically corn starch, tapioca, agar agar, pectin, gelatin, the albumens, and water-soluble gums, for example, tragacanth, arabic, karaya, etc. Combinations of such water-absorbent bodier components may be utilized, employing several thickeners simultaneously, if desired. And such water-absorbent bodier components are incorporated with the desired hard fat components described above, preferably using relatively large amounts of bodier.

While any desired combinations of such hard fat materials and water-absorbent bodier components can be made, the final composition should be desirably of a mixture of components in proportions to yield a relatively smooth, pliable, plastic material, particularly when the composition is beaten, since, in this form, it enables ready admixture of other food components, flavoring material, condiments, etc. to be introduced, or where the added components are not fluid or more or less liquid in character, such base materials may be incorporated with solid components, either ground or in pieces, as, for example, dates, nuts, figs, meats, etc.

The most desirable way for producing the combination of the water-absorbent bodier component with the fatty component is to convert the water-absorbent bodier component into a relatively heavy paste with water, or with other aqueous materials, such as vinegar, honey, sarsaparilla sirup, etc., the proportions of water-absorbent bodier component in water being chosen to yield a relatively heavy paste. If desired, the water and bodier component may be heated together, as, for example, when tapioca flour or corn starch are admixed with water and heated to form a relatively thick paste. Other materials, such as the water-soluble gums, for example, gum arabic, may be admixed with the water to produce a composition which requires no heat. The relatively heavier water-absorbent bodier component carried in the aqueous base material may then be readily incorporated with the desired fatty component, and intimate admixture of the ingredients produced with relatively simple operations, because of the nature of these components.

For example, 85 parts by weight of tapioca flour or corn starch may be heated with 320 parts (or more if required) by weight of water to form a thick paste, whereas a heavy material may be produced from gum arabic with water, using substantially higher proportions, but without utilizing any heat. This pasty type of material may then be incorporated with the hard fat component, using for example, about 900 parts by weight of the fatty material of character set forth above. Intimate incorporation of the product gives when beaten a smooth, pliable plastic material, which can be readily admixed with other flavoring materials, and with other food ingredients, and yet at room temperature or cooler temperatures, depending upon the type of fats or oils that are used, the composition is in the form of a substantially solid material, and may be printed, for example, to give a brick material, which can be packaged as such, or the material may be made fluid enough by heat treatment to be packaged in situ in cartons, or other desirable containers.

The base materials produced as set forth above are particularly desirable in the production of various types of food compositions, flavoring materials, etc., because the presence of water or moisture in the base material enables it to pick up and carry the water-soluble flavors of added flavoring ingredients that are mixed with it, while at the same time, because of the fat component, fat-soluble flavors of the added flavoring ingredients may also be readily incorporated into and carried in the base material. Thus the product is adapted for use as a base in making food products of both water-soluble and fat-soluble nature, or of a nature where both water-soluble and fat-soluble requirements are necessary. These features enable a high degree of flavoring component to be employed.

Desirably where flavoring components (particularly when water-soluble or containing water-soluble components) in the nature of the condiments are incorporated, these desirably are intermixed with the aqueous vehicle carrying the water-absorbent bodier component, so that a fuller flavor of the condiment, spice, and flavoring ingredients is thus obtained, these mixtures being produced before the incorporation of the hard fat component. As exemplary of the production of spreads utilizing the base materials of the present invention, the following may be given: a heavy paste is produced from tapioca flour or corn starch with water, using the proportions given above of 85 parts of the former to 320 parts of the latter, and the ingredients being heated together to form the desired thick paste. Flavoring materials such as mustard or ginger and cinnamon (with or without sugar) are then introduced in required proportions, for example, 150 parts more or less as required, of the flavoring components may be incorporated into the thick paste produced immediately above. Thus using dry cinnamon, and preferably with some added water, a cinnamon spread is produced. After incorporation of the desired condiments or flavors the resulting composition is then intermixed with the hard fat component, such as a fatty material having a melting point around 105° or 110° F. If desired, heat may be utilized in producing the intermixture of ingredients. The proportions of hard fat incorporated may be varied, dependent on the final consistency, but in the production of the plastic spread type of material about 900 parts by weight may be utilized with the components given immediately above. Finally sugar and water, particularly carrying some thickener, may be utilized for addition to the material described after intermixture of the hard fat. For example, 20 parts by weight of tapioca with 200 parts by weight of a water-sugar composition may be employed, desirably together with 20 parts by weight of gelatine or pectin.

Generally when bodier materials such as corn starch or tapioca flour, are added to maple syrup or honey and cooked, the resulting composition does not exhibit as much body as that which is normally obtained when such water bodier agents are cooked with water or materials having a high aqueous content. Generally, therefore, it is desirable in producing the paste materials with such substances as maple syrup, honey and other similar syrups, that an additional amount of water be added to the syrup before cooking with the water bodier materials such as corn starch or tapioca flour, in order to form a paste or heavy paste material.

The resulting final composition produced by the example given above is a very desirable spread, firm enough to be packaged in cartons or other types of containers in printed form if desired, or at slightly elevated temperatures to flow so that the deposition in the desired container may be made in situ. At the cooler temperatures normally prevailing in refrigerators, the material is solid enough to be used as a direct spread, whereas if permitted to warm up to even room temperatures, the material has a thinner consistency making it flowable. The final addition of thickeners or water bodier agents in the production of the spread as set forth above is not essential, but is desirable to minimize possibility of breaking the emulsion. Furthermore, the added thickeners or similar agents increase the tendency of the water to remain held and bound in the composition, and to avoid seepage therefrom; and further, more water can thus be introduced to control the flavor or taste of the composition, to lessen oily taste on the tongue, etc.

The example given above is illustrative of the production of the solid spreads, whereas thinner products may also be readily produced in accordance with the present invention.

It will be seen that under the present invention, even though there are substantial quantities of water present in the composition, its introduction into the heavy paste material enables it to be readily incorporated with the other components, and yet the texture of the product is maintained even during transportation.

In production of the spreads, etc., as noted above, the various thickeners or related bodier agents are desirably incorporated with the moisture ingredient, either the water or aqueous materials. The proportions of the water bodying component, such as thickener, may be varied, higher concentrations having been found to give better results in the way of an improved heavy body and texture of the material. The admixture of the moisture elements, that is, the water-absorbing materials with the aqueous components, has the advantage in the production of solid materials and other types of compositions from these base materials, of absorbing moisture and preventing seepage.

While with many cases of prior art types of materials, the presence of large quantities of water or moisture-containing products, produces a tendency for the excess moisture to cause splitting of the emulsion or emulsion-like product, the presence of the water-absorbent bodier components of the present invention preserves the texture and consistency of the products, and materially reduces any tendency to separation or splitting of the emulsions, so that the products retain their desired texture and consistency over long periods of time, under varying conditions of transportation, etc.

The utilization of the food base in the manufacture of spreads, etc. is a distinct improvement, because of the better moisture absorbing qualities referred to, particularly when used in conjunction with juicy foods, etc., and enables the spreads to hold added liquids frequently incorporated for thinning purposes, while giving improved texture and body. Furthermore, the consistency of the product is such that during manufacture, when there is incorporation of more or less air into the product, a better product is produced, and particularly the product is of less oily character. The fact that the use of this food base results in a product of less oily character is particularly important, because of the general prejudice against oily products. The consistency of the product may be maintained even though the hard fat content is reduced in the final product to as low as 25 to 30%.

The presence of the base material in the production of the spread gives additional thickening and bodying power in the finished product, so that the finished product maintains its texture, and there is markedly less tendency to segregation of the components.

In the utilization of the food base material, it has been found that a considerable improvement results in the processes of using such base material and the product produced therefrom due to the fact that all or a portion of the water or moisture-containing ingredients of the product, such as the lemon syrup, etc. is cooked with the corn starch or other thickeners or bodier agent, thereby absorbing any excess moisture which would normally be present in the food product. These features are particularly important where the final product contains a considerable amount of water or liquid, and where the desired final composition is to have many of the taste and flavor characteristics of prior art relatively thin materials, but under the present invention they are to be produced in a substantially solid form.

The food base material of the present invention is also desirably employed to stiffen emulsions, mixtures, solutions, suspensions, etc. For example, many prior art food products are of a relatively thin pasty material of more or less fluid character. Its nature and consistency is relatively fixed. While additions may be made of materials in amounts to increase the consistency, such additions may tend to split the emulsion during transportation if such breaking of the emulsion does not actually take place immediately upon addition of the further material. While cooked starch or other thickeners might be added to the prior art products to give a heavier body, the product would generally be too gummy. The use of the base material as illustrated above, may be made, however, in order to produce heavier body without the emulsion separating readily, and without unusual gumminess. By control of consistency in this way products such as mustard spread, chocolate icings, etc. can be made as a heavy jar product by diluting the "brick" and converting it into paste form and vice versa. The base materials set forth above are not limited in value to the production of spreads or similar materials, but because of their nature may be desirably employed in a variety of ways in producing novel types of food compositions.

Thus the food base may be mixed with flavor and food ingredients of various kinds to produce products in brick form, and can be thinned with various liquids, such as water, milk, salad oil, etc. in amounts depending upon the final consistency desired by the consumer. Since the amount of liquid that may be added for thinning purposes, etc. depends upon the water-holding qualities, the presence of the water-absorbent bodier component in the food base enables such products to absorb and hold additional liquids to the extent desired. This is particularly advantageous in the production of various types of products, such as those of thinner consistency, including cake fillings, spreads, sauces, drinks, icings, etc.

The nature of the product is such as pointed out above that although thinning liquids, such as water, oil, or other liquid materials are incorporated, substantial amounts of such liquids can be introduced while still maintaining the substantially solid texture of the material at room temperature or cooler temperature enabling packaging in cartons, etc. to be carried out.

The value of the base material is such as to give to food compositions new spreading and taste qualities. While fats by themselves are much too oily when eaten or spread, and starches, thickeners, gums, etc. are too thick and too pasty when eaten or spread, the combination of fats and thickeners, etc. utilized in the base material of the present invention enables spreading qualities to be given to a variety of food products that do not normally possess it, so that new spreading qualities and entirely new taste characteristics may be given to food compositions without undesirable fattiness or gumminess.

As exemplary of the use of the base material in the production of various types of products and other spreads, the following material may be referred to.

The base can be utilized for giving spreading qualities to various types of products. For example, grape jelly may be spread over bread, but does not have the same spreading quality as is found in butter. And further the jelly tends to sog into the bread. If grape jelly is incorporated with the base material of the present invention, it can be packaged in solid form much like butter, and yet will have the desired spreading quality without sogginess being produced in the product on which the material is spread. Similar considerations apply to combinations of the base material with honey, chocolate syrup, chile sauce, etc.

The food base material may desirably, for example, be incorporated with peanut butter. The food base when mixed with peanut butter gives good spreading qualities to the final product, and enables it to be packaged in pasteboard containers, etc. The binding action of the starch or other thickener tends to prevent segregation of oil in the product, and to maintain the oil in suspension in the water-thickened material. Since the peanut butter also contains water-soluble flavors, an improved flavor is obtained. The higher water content enables reduced cost products to be obtained, while still maintaining the desired flavor and other characteristics in the products.

The food base material may be employed in the production of materials in the nature of the so-called marshmallow whip, employing for example, a composition of the base material with peanut butter and marshmallow flavoring ingredients. While in such cases as indicated, the food base material can be made up and the flavoring ingredients incorporated into the food base, it is preferable to incorporate the flavoring components, depending on their nature, into one of the food base components before the final composition is produced. Oil-soluble flavoring materials can thus be incorporated into the fatty component of the food base before the bodying material is incorporated with the hard fat, while water-soluble flavoring materials can desirably be utilized in the production of the paste of bodier material before incorporation of the hard fat, and similar considerations apply to coloring materials, which can be incorporated into one phase or the other before the final admixture, depending on whether they are water or oil soluble. Furthermore, in many of these cases, the flavoring materials may in their very nature be of a character where they include bodying ingredients, and may serve, therefore, in both capacities as a source of the bodier and of the flavoring. As exemplifying some of these features, the production of a marshmallow material may be given and produced in the following way rather than in that indicated above.

Thus marshmallow (with water if necessary) may be incorporated with about 50% by weight of a melted hard fat of the character given above, the fat being desirably added slowly to the marshmallow material, and beaten thereinto. After the incorporation of the fat with the marshmallow, peanut butter in an amount equal to the amount of marshmallow may be utilized. The marshmallow in such composition not only serves for flavoring purposes, but since marshmallow contains substantial quantities of gums, it also serves as the bodying material in such composition.

It has further been pointed out above that materials ordinarily employed, such as honey, maple syrup, wine sauces, etc., in the form of relatively liquids, may in accordance with the present invention be readily converted into substantially solid pasty materials that can be utilized in brick form. Thus in the preparation of a substantially solid maple syrup, the following practice may be followed. Maple syrup (with water if necessary) may be admixed with from 10 to 15% by weight of corn starch, and the two components cooked together, after which hard fat of the character referred to above may be incorporated, utilizing 60% of the amount of hard fat based on the amount of maple syrup present. The resulting product is a substantially pasty maple syrup having a high content of maple syrup, and the flavor and other taste characteristics of such maple syrup as ordinarily employed, but in the present invention is converted into a substantially solid form, in which it can be utilized in accordance with the features set forth above.

In an analogous way, a wine spread may be made utilizing wine as the aqueous medium incorporated with the bodier, followed by incorporation of the hard fat. Similarly flavoring and coloring compositions can be produced. Thus an oil-soluble flavor, such as oil of lemon, or other essential oils, like cinnamon oil, clove oil, etc., can be first converted into substantially solid essential oil material by incorporating such oil into the fat component of the food base material, followed by incorporation with the bodier component. Flavoring compositions, coloring materials, etc. in the form of useful plastic base materials can thus be produced for utilization in lieu of the usual types of flavoring or coloring substances.

Any of these solid essential oils, coloring materials, etc., in plastic form of the character produced in accordance with the present invention, can be utilized just as readily as the liquid essential oils of the prior art, in view of the characteristics indicated above.

Analogously, spreads of various types, such as cinnamon spreads for use in making cinnamon toast may be produced, utilizing cinnamon and sugar for incorporation into the aqueous paste of bodier components, followed by incorporation of the hard fat in the manner set forth above.

Having thus set forth my invention, I claim:

1. A food base made from an intimate mixture of a heavy aqueous paste containing a water-absorbent bodier and a hard fat in proportions to yield a substantially solid plastic material.

2. A food base made from an intimate mixture of a heavy water paste containing a water-absorbent bodier and a hard fat component having a melting point of from 70–120° F., in proportions to yield a substantially solid plastic material.

3. A food composition made from an intimate mixture of a heavy water paste containing a water-absorbent bodier, a flavoring component, and a hard fat, in proportions to yield a substantially solid plastic material.

4. A food composition made from an intimate mixture of a heavy water paste containing a water-absorbent bodier, a hard fat, and an added food component, the components being present in proportions to yield a substantially solid plastic material.

5. The method of preparing food materials by intimately incorporating a water-absorbent bodier component with an aqueous material and a hard fat to produce a substantially solid plastic material.

6. The method of producing base materials by intimately mixing water and a water-absorbent bodier material in proportions to yield a heavy paste, and incorporating a hard fat into said composition.

7. The method of producing base materials by producing a heavy paste from an aqueous material and a water-absorbent bodier component, and incorporating a fat component having a melting point of from 70–120° F. into the paste material.

8. The method of producing food compositions by preparing a heavy paste containing a water-absorbent bodier carried in an aqueous vehicle, adding a flavoring component thereto, and incorporating the resulting composition with a hard fat in proportions to yield a substantially solid plastic material.

9. A food base made with an intimate mixture of a heavy aqueous paste containing starch as a water-absorbent bodier and a hard fat in proportions to yield a substantially solid plastic material.

10. A food composition made from an intimate mixture of a heavy water paste containing a water-soluble gum as a water-absorbent bodier, a flavoring component, and a hard fat, in proportions to yield a substantially solid plastic material.

11. A food composition made from an intimate mixture of a heavy water paste containing pectin as a water-absorbent bodier, a hard fat, and an added food component, the components being present in proportions to yield a substantially solid plastic material.

ALBERT MUSHER.